United States Patent Office
3,451,517
Patented June 24, 1969

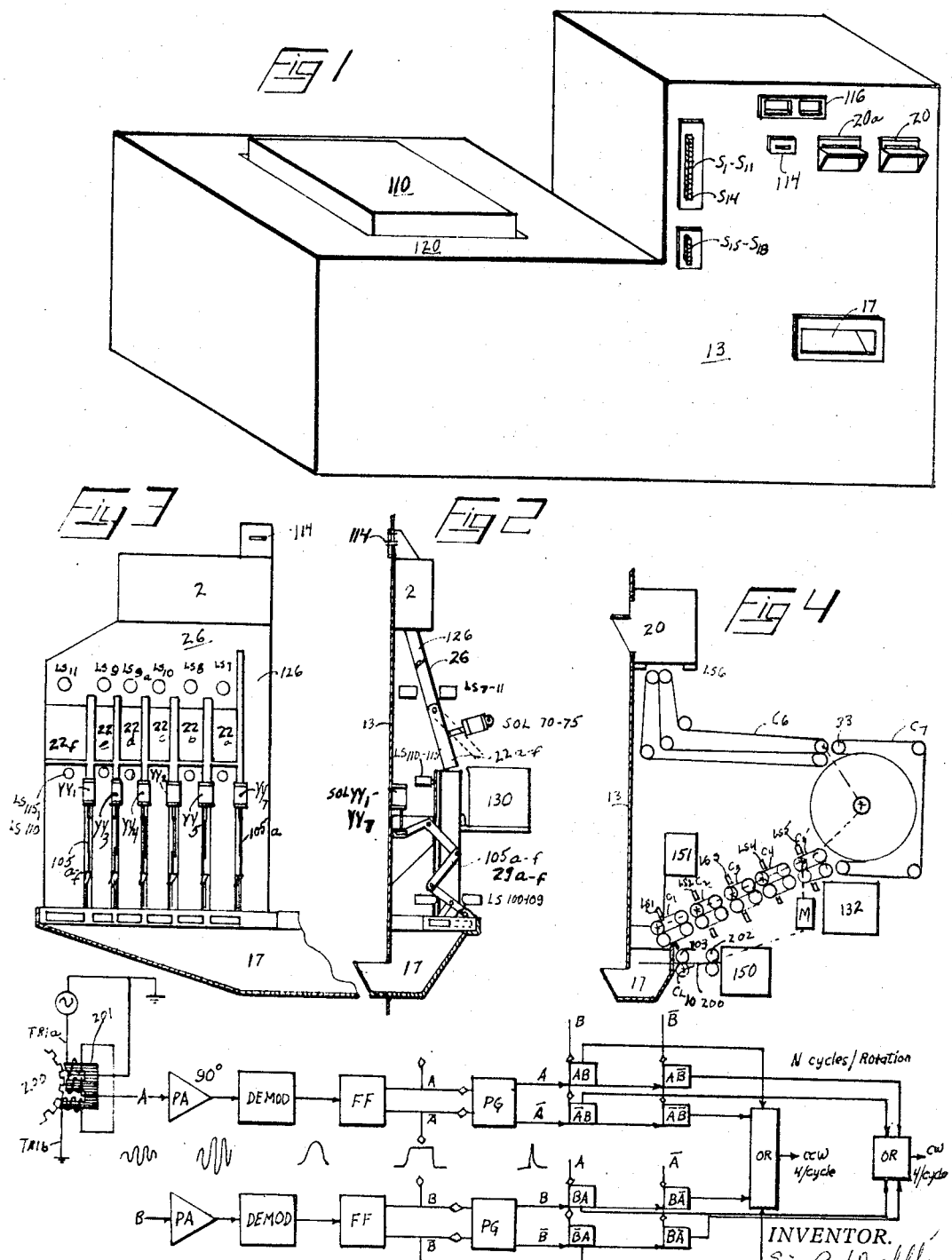

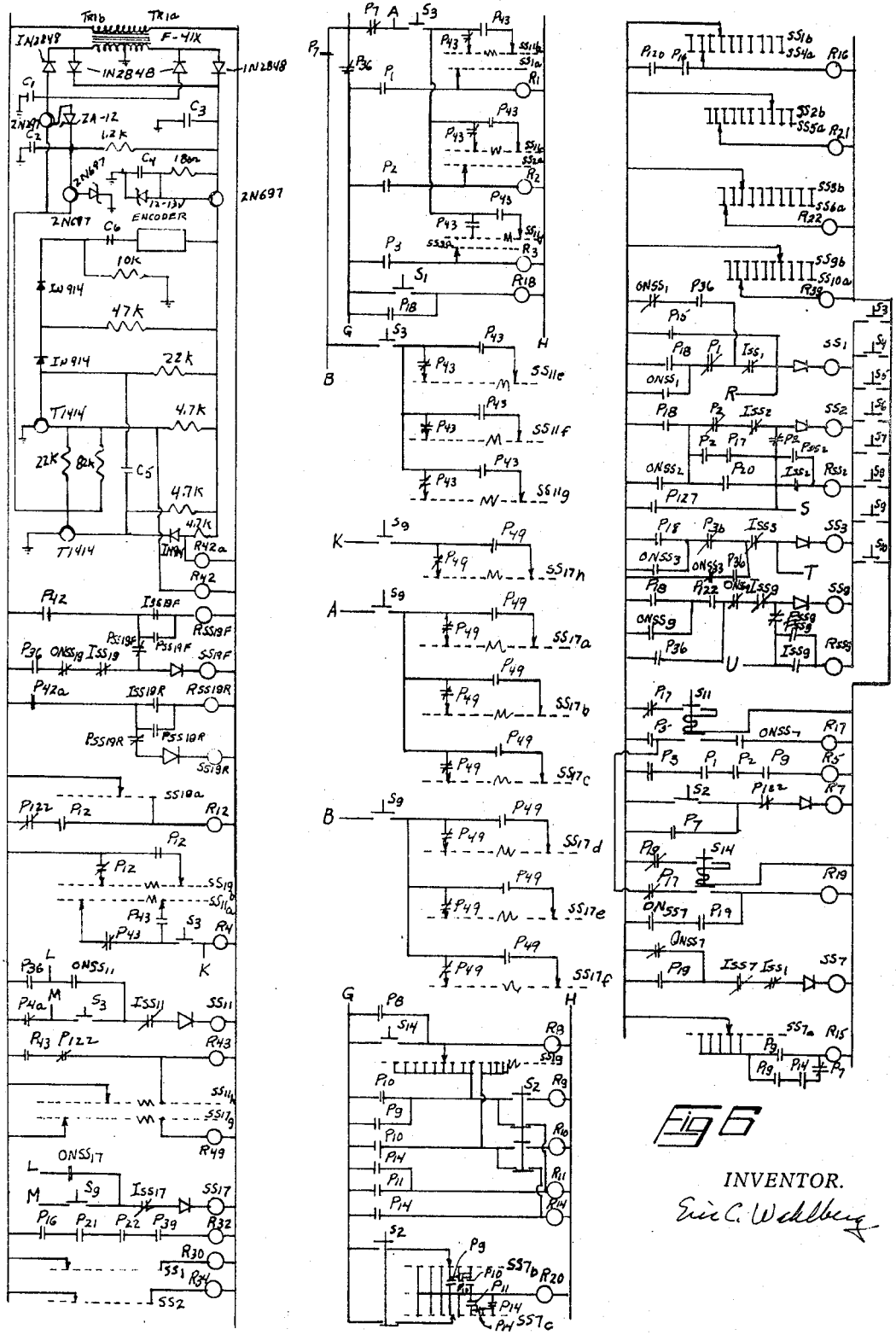

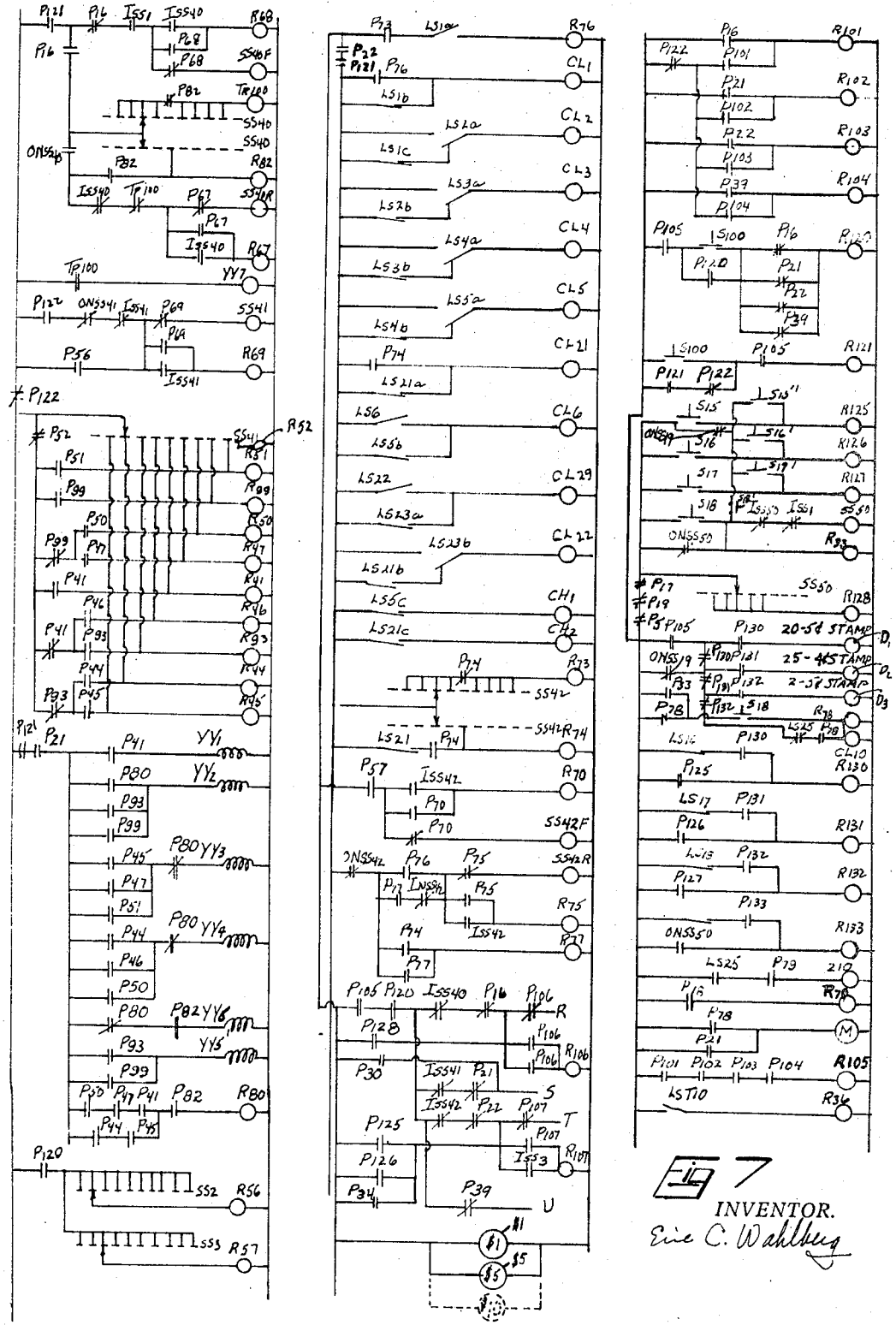

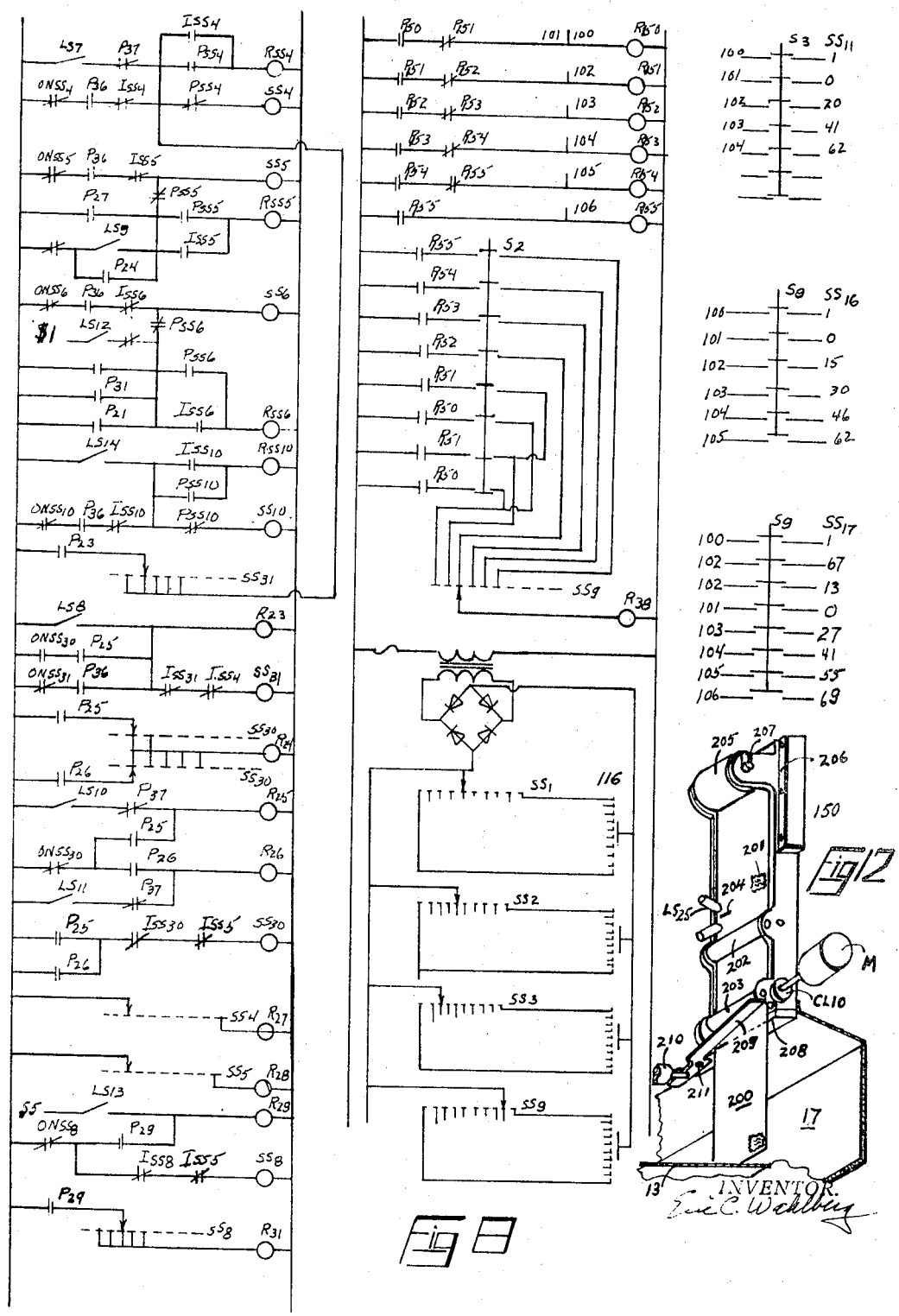

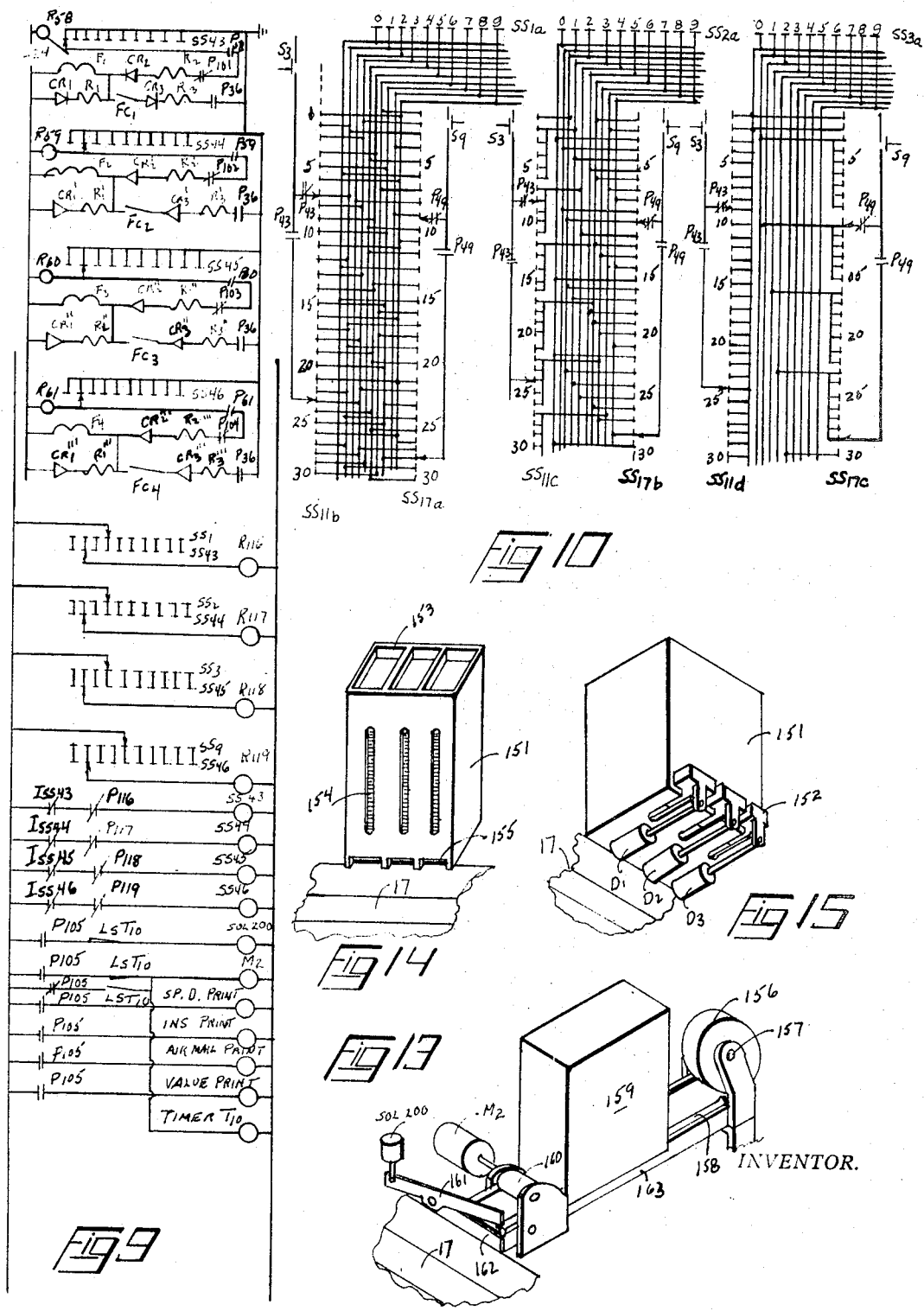

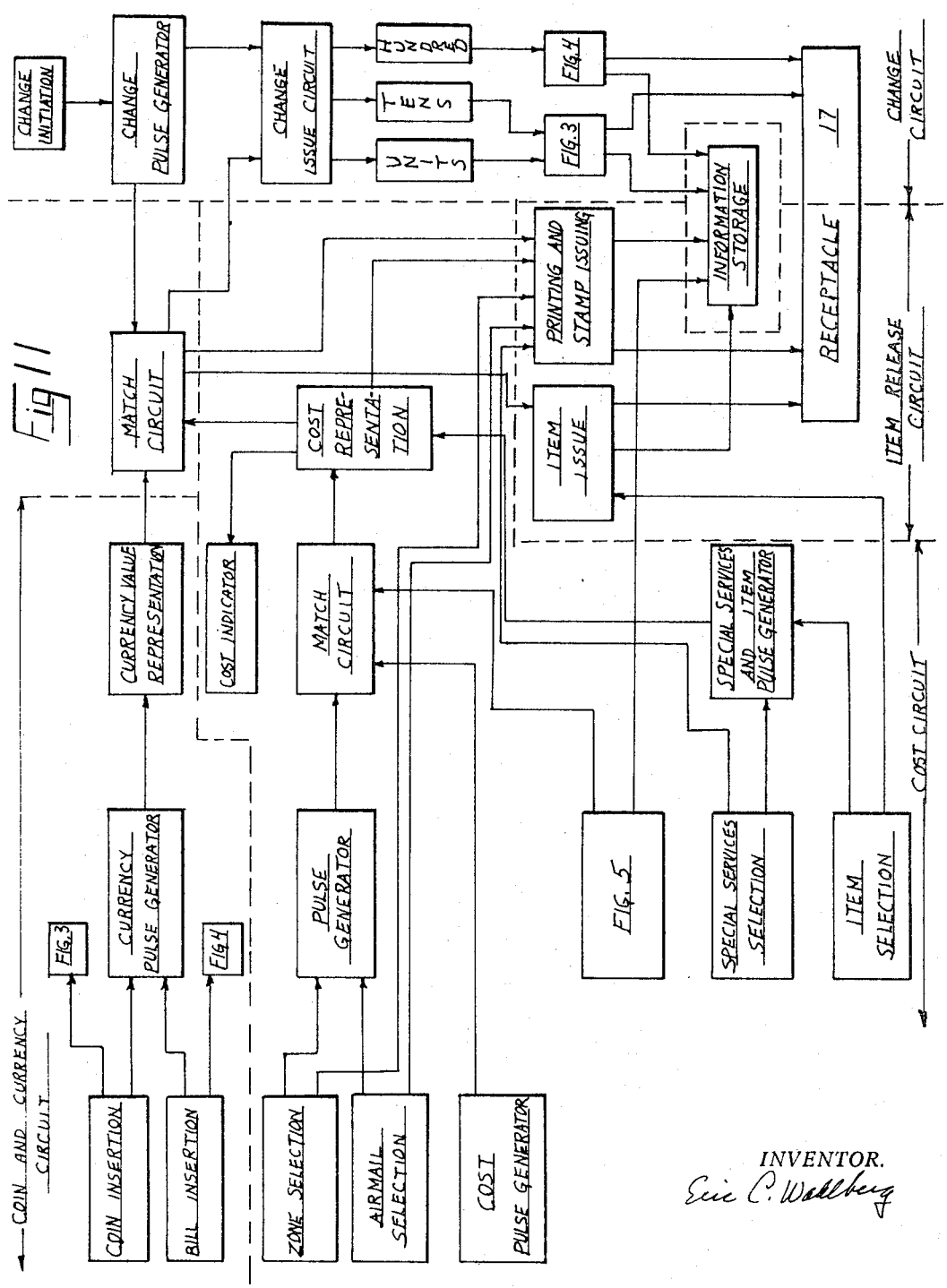

3,451,517
POSTAL VENDING MACHINE
Eric C. Wahlberg, 32 8th St., Stamford, Conn. 06905
Filed July 8, 1966, Ser. No. 563,804
Int. Cl. G07f *17/00, 11/00*
U.S. Cl. 194—2       12 Claims

ABSTRACT OF THE DISCLOSURE

A postal vending machine for automatically determining the cost of mailing a package according to its weight and destination and special services desired such as airmail and special delivery, automatically issuing a mailing tape for the package, automatically dispensing and determining the cost of stamps, postcards and various other items and automatically totaling the cost of the transaction, comparing the total cost with the amount of money inserted in the machine and dispensing the difference, if the amount of money inserted is greater than the total cost.

---

This invention pertains to a type of machine which provides for the combination of automatically handling the many transactions associated with article shipping and routing especially in the Post Office, and of vending articles associated with Post Office operations such as stamps, post cards and the like.

The embodiment shown and described is directed specifically to the combination of a machine which will automatically perform the functions of accepting and detecting the value of money, calculating the cost of shipping a parcel when it is placed on an associated scale and the zone and special service information is introduced into the machine, issuing a printed stamp for the parcel, and/or issuing postal items in accordance with information fed to the vending portion of the combination in response to money detected by the machine. These functions are correlated and, combined in response to various signals received from information inserted by the patron.

One of the primary objectives of this invention is to provide an improved device which will automatically perform the largely perfunctory steps necessary in computing the charges to transport a particular package of a certain weight to a particular destination under certain conditions of service and to receive payment for these services.

Another objective is to provide a machine as described above with faciilties to issue postal items in response to information and payment inserted in the machine and to issue a receipt for these articles and for such charges as might be imposed for any package handling requirements.

Another objective is to provide circuitry representing parcel rates for each zone which may be individually switched into the calculating circuit to determine the cost to transport a package to any selected area.

Another object is to provide a machine capable of having its cost value circuits easily adjusted to reflect periodic changes in postage rates.

The present invention has another object in that apparatus for use in determining the cost of transporting a package includes a plurality of networks each associated with a destination to indicate transportation cost as a function of weight and destination.

Another object of the present invention is to construct a vending machine that totals the costs of a plurality of selected items, receives payment after the costs have been totaled, compares the total cost with the total payment received and dispenses change and the selected items.

Other objects and advantages of this invention will be apparent to those skilled in the art after reading the following specification in connection with the annexed drawings, in which:

FIGURE 1 is a front perspective view of a preferred form of a postal vending machine according to the present invention.

FIGURE 2 is a side view of the coin receiving and change making mechanism of the present invention.

FIGURE 3 is a front view of the coin receiving and change making mechanism shown in FIGURE 2 with the case removed.

FIGURE 4 is a schematic diagram of the bill changer mechanism of the present invention.

FIGURE 5 is a block diagram of the weight determining system of the present invention.

FIGURES 6, 7, 8, 9 are circuit diagrams of electrical systems for performing the functions of the present invention.

FIGURE 10 is a schematic diagram of the zone circuit connections for weight and cost determination.

FIGURE 11 is a block diagram functionally relating the various components of the present invention.

FIGURE 12 is a view of the post card issue mechanism 150 of FIGURE 4.

FIGURE 13 is a perspective view of a stamp printing and issuing assembly.

FIGURES 14 and 15 are front and rear perspective views, respectively, of an item issue mechanism.

Similar reference characters represent similar parts and functions as performed by this invention.

In general the embodiment described below is for installation at a Post Office or in a shopping center or department store for the convenience of customers.

Referring to FIGURE 1, the machine 13, comprises, in general a cabinet having a table like section 120 on which is located a scale platform 110. Attached to section 120 is an upright cabinet on the front face of which are located switches S1 through S11, S14 through S18 used to select zone, services, and postal items, a receptacle 17 for the gathering of postal items selected by pushing in S15, S16, S17, or S18; a tape stamp having indicia in accordance with the actuation of switches S3 through S11 and S14, and such change as may be dictated by over-insertion of money in coin and bill slots 114, 20 and 20a. Above the receptacle 17 is located a coin receiving slot 14, bill validators 20 and 20a, and a visual cost indicator 116. The controls and mechanism required for calculating cost, detecting coins and bills, and issuing change, tape stamps and selected items, are located inside the cabinet 13. Function and instruction plates are conveniently located. The select switches S1 through S18 are pushed to actuate the circuits as hereinafter explained in connection with FIGURES 6 through 10.

Referring to FIGURE 2, a partial sectional view of cabinet 13 shows coin receiving slot 114 cooperating with coin acceptor 2. A chute assembly 26 feeds coins from the coin acceptor 2 through the appropriate deflector 22a–f to coin storage tubes 29a–f. Solenoids 70–75 are shown in position to transmit coins to storage tubes 29; however, the coins can be deflected to coin storage container 130 when switches LS110–LS115 indicate a tube is full as explained hereinafter in discussion of FIGURES 6–11. Coin changer or storage tubes 29 are located above and cooperate with receptacle 17 to feed change into the receptacle as dictated by the circuitry. The coin tubes are actuated through solenoids YY1–YY7 and lever assembly 105a–f. LS110–115 indicate when the coin tubes are full. Coin-tube-empty limit switches are LS100–109. Coin value switches are LS7–LS11. All these switches are used in the control circuit as hereinafter explained in connection with FIGURES 6–11.

FIGURE 3 is a front view of FIGURE 2 showing the coin receiving and change making mechanism. In addition to that shown in FIGURE 2 there is shown a chute 126 into which nonacceptable coins, etc., are directed by the coin detector 2. These articles are deposited in the receptacle 17 and bypass all circuit functions.

Referring to FIGURE 4, the bill validator 20 and conveyors C6 and C7 are cooperative with extra bill hopper 132 and through conveyors C1–C5 and associated clutches, switches, and drive to change hopper 17 of cabinet 13 of FIGURE 1.

Referring to FIGURE 5, a block diagram shows a system used to produce pulses from the rotary motion produced as a result of vertical motion of platform 110 of FIGURE 1. Platform 110 produces a rotary motion through translation of vertical motion in a scale the output shaft of which is attached to a shaft having a segmented disc 200. Rotation of disc 200 produces pulses in a magnetic field which are passed through a series of stations to refine and amplify their characteristics into a signal as indicated in shape and at the rate of one pulse for each quarter cycle for each of N number of cycles per revolution of the shaft and separated as to CW or CCW rotation. Thus, any position of the scale would have produced four pulses times the cycles per revolution multiplied by the percent of rotation of the disc caused by the scale.

Referring to FIGURE 11, the interrelated functions of the mechanisms of FIGURES 1 through 9 as coordinated with circuit functions of FIGURES 6 through 10 are illustrated in functional block diagram form. The circuitry for operating postal vending machine 13 comprises in general a coin and currency circuit and a cost circuit each of which have an output to a master match circuit which has an output to actuate an item issue circuit, a print and stamp issue circuit and an output which feeds into the change issue circuit. As a result of an output from the change pulse generator initiated by the change initiator and fed into the master match circuit and the change issue circuit, the coin change apparatus of FIG. 3 and the currency change apparatus of FIG. 4 are actuated. The total change is deposited into the receptacle 17 as are the stamps or items selected. The output of the item issue, printing, and change circuitry and the circuitry of FIG. 5 are fed into information storage.

The coin and currency circuit consists of coin inserting means, bill inserting means, coin and bill storage means as shown in FIGS. 3 and 4, pulse generating means and currency value representation means.

The cost circuit includes a zone selection circuit and an airmail selection circuit the outputs of which are fed to a pulse generator which is connected to a match circuit as is the circuitry of FIG. 5. The output of the match circuit is fed to a cost representation circuit. Included in the cost representation is a special services selection circuit and an item selection means, the outputs of which are fed to a pulse generator whose output is fed to the cost representation circuit. The output of the cost representation circuit is fed to a cost indicator and the master match circuit.

FIGURE 12 illustrates the post card issue mechanism 150 of FIGURE 4 which includes a strip card roll 205 on a shaft 207 mounted in slots of frame 206. The card roll has predetermined spaced stamp impressions 201 and reference lines 204. The reference line 204 passes beneath a photocell unit as the card moves forward by motor driven clutch controlled roller 203 and roller 202 past knife edges 208 and 209. The knife edge 209 is operated by solenoid 210 in response to LS25 to cut the card and deposit it in receptacle 17. The circuit for operating motor M and clutch CL10 and solenoid 210 in response to LS25 is controlled by the circuits of FIGURES 6–10 and is more fully described in the discussion of these circuits.

Referring to FIGURE 10, a sample connection diagram is shown for cost determination for zone and weight values in which the contacts of SS11$b$, $c$, $d$ are represented in pounds and SS1$a$, SS2$a$, SS3$a$ are representing dollars and cents, and SS11 represents zone 3. S3 is selector switch for zone 3 located on panel 13 of FIGURE 1. Pushing S3 in connects the contacts of SS11 to power as the contact arm of each bank is matched to SS19 and, in turn contacts of SS1$a$, SS2$a$, SS3$a$ are respectively connected to power as predetermined connections are made to SS11. The switching and other operations required to make proper circuits are discussed more fully in describing the circuits of FIGURES 6–9.

Referring to FIGURE 13, a perspective view of a form of a stamp printing and issuing assembly shows a tape roll 156 and holder 157, a tape guide 158, a print mechanism 159, a tape advancing mechanism, a solenoid 200 actuated knife 161 and receptacle 17. The print mechanism can be any conventional unit such as that manufactured by the Pressin Co., together with such fixed identifying indicia required, in which individual print wheels are positioned in accordance with signals from the circuitry of FIGURES 6–9 as hereinafter more fully explained. The tape advance mechanism consists of a set of rollers 160 driven by motor $M_2$, between which passes the printed tape as monitored by the above mentioned circuitry. The knife consists of a blade 161 pivotally mounted to a stationary blade 162 and actuated by solenoid 200 which causes the tape 156 to be cut in response to the above mentioned circuitry. The tape is pulled from the tape roll 156 through tape guides 158 under print mechanism 159 by rollers 160 driven by motor $M_2$ between shearing blades 161 and 162 and cut by operation of solenoid 200, the cut portion falling into the receptacle 17. The circuitry of FIGURES 6–9 positions the print wheels of 159 and signals the printing of the information positioned in print relationship with the tape. This signal causes the motor M to start when printing is completed, and the tape to advance a predetermined distance to be cut by knife blades 161 and 162 as timed by a timing motor in the aforementioned circuitry.

Referring to FIGURE 14, a front perspective view of the item issue mechanism consists of a hopper 151 with individual chutes 153 and openings 154 for visual checking of items. Openings 155 in the front walls at the bottom of the chutes provide a means whereby the items may be individually ejected into the receptacle 17.

Referring to FIGURE 15, a rear perspective view of FIGURE 14 shows a form of ejection mechanism in which solenoids D1, D2 and D3 in response to the circuitry of FIGURES 6–9 pull pusher head 152 to cause the selected item to be pushed out of chute 153 through opening 155 into receptacle 17 as shown in FIGURE 14.

The circuit for operating the postal vending machine comprises in general, a cost circuit, a coin and currency circuit, a match circuit, and item release circuit, and a change circuit.

Referring to FIGURES 6, 7, 8 and 9, FIGURE 6 represents cost circuitry as does R106, R107, R121, R125, R126, R127 and SS50 of FIG. 7.

The coin and currency circuit is represented by the left hand column of FIGURE 8 plus the overlapping portion of the right hand column of FIG. 6 including SS4$a$, 5$a$, 6$a$, 9$a$. The match circuit is represented by R16, R21, R22, R39, in the right hand column of FIGURE 6.

The item release circuit is shown as lower right hand corner of FIGURES 7 and 9.

The change circuit is shown in the left and center column of FIGURE 7.

The cost circuitry consists of zone selection circuitry shown in FIGURE 6; airmail selection circuitry including S2 in FIGURES 6 and 8; special services selection circuitry including S15, S16, S17, S18 in FIGURE 7; weight to position conversion circuitry shown in upper left corner of FIGURE 6 and FIGURE 5; a pulse generator for zone and airmail including ISS3–ISS11 and SS3–SS11, respectively; a cost pulse generator including ISS1, ISS2, ISS3, and ISS9 circuitry and their respective switches SS1, SS2, SS3, SS9; a match circuit including SS19 bank contacts matched against SS11–SS17 bank contacts individually matched against SS1, SS2 and SS3 bank contacts which gives an output to cost representation circuit as shown by SS1b, SS2b, SS3b, SS9b bank contacts in FIGURE 6; a special services and item pulse generating circuit including R17 and SS7 bank of contacts in FIGURE 6, SS50 bank of contacts, R126, R125, R127 in FIGURE 7 and having an output to cost representation circuit mentioned above; and a cost indicator as shown in the lower center column of FIGURE 8 and in FIGURE 1 as 116.

The coin and currency circuit consists of coin recognizing circuitry including LS7–LS11 in the left column of FIGURE 8; a bill recognizing circuit including $1, $5, $10 circuitry in FIGURE 7 and LS12–LS14 in the left column of FIGURE 8; a currency generator circuit shown in the left column of FIGURE 8; a currency value representation circuit including SS4a, SS5a, SS6a, SS10a bank contacts in upper right of FIGURE 6.

The match circuit is shown as SS1b, SS2b, SS3b, SS9b bank contacts matched respectively to SS4a, SS5a, SS6a, SS10a bank contacts.

The change circuit consists of a change initiator circuit including S10 in FIGURE 7; a change pulse generator circuit shown as LSS40, ISS41, ISS42 in the SS1, SS2, SS3, SS9 circuits in the lower center column of FIGURE 7; a change issue circuit shown in left and center column of FIGURE 7; a units change issue circuit including the SS40 circuit and the YY7 solenoid in upper left of FIGURE 7 and controlling the penny coin tube of FIGURE 3; a tens change issuing circuit including the SS41 circuit and solenoids YY1–YY6 controlling the coin tubes of FIGURE 3; a hundreds or dollar issue circuit including SS42 and associated circuitry including CL1–CL6 and CL21, CL22, CL29 shown in center column of FIGURE 7 and associated circuit controlling currency mechanism of FIGURE 4.

The item release circuit consists of an item issue circuit shown in lower right column of FIGURE 7 and a print and stamp issue circuit shown in FIGURE 9.

It should be noticed that for clarity of operation, similar components in similar banks of circuits have the same numerals with different letter designations. Also, such items as contact protection voltage generators, transient voltage protection, etc., which are normal design items in the art have been omitted in order to simplify the drawings.

Bill validators and acceptors 20 and 20a are conventional and may be of any desired commercial type as manufactured by Coin Acceptors, Inc., St. Louis, Mo., and others.

Coin acceptor 25 is conventional and may be of any desired type as manufactured by National Rejectors, Inc., St. Louis, Mo., and others.

OPERATION OF CIRCUITRY

A package is placed on the scale platform 110 of FIGURE 10. This causes displacement of platform 110 resulting in proportional displacement of an integral drum to which is attached the shaft of the disc 200 of FIGURE 5. The rotation of the disc 200 causes pulses in the magnetic circuit 201 which are amplified, demodulated and shaped as shown in FIGURE 5. One pulse is obtained at the exact point of transition from one pound to the next. This pulse energizes R42 if the disc is rotating in the CW direction and R42a in the CCW direction. The pulse of R42 causes SS19 to step once for each pulse due to PP42 in the SS19 circuit closing once for each pulse. Thus the contact on which SS19 stops represents the weight of the package in pounds.

The package is to be sent to a destination in some zone such as that represented by pushing button S3. Pushing S3 causes SS11 to be connected into the circuit and to step until its arms are in a position which matches that of SS19 arm as it has been positioned above by the weight of the package on the scale. At this point R4 is energized and thereby opens the circuit to S11. Contacts of three SS11 banks are tied to SS1a, SS2a, SS3a respectively in such a manner as shown in FIGURE 10, as to represent the cost of the weight in the Zone represented by S3 on SS1 as pennies, on SS2 as tens, and on SS3 as dollars. The networks shown in FIG. 10 each have a memory including transportation cost data with respect to a geographical zone or area.

The initiating of matching the selected zone stepping switch SS11 is obtained by pushing S1 which energizes relay R18. Contact P18 energizes SS1, SS2, SS3, SS9 of the cost representation circuit causing SS1, SS2, SS3, SS9 to step by means of cost pulse generator switches ISS1, ISS2, ISS3, ISS9 until their respective stepper arms match the electrical circuit of corresponding zone banks of SS11. When this match occurs, relays R1, R2, R3 will be energized and lock themselves into the circuit. As a result, contacts P1, P2, P3 open causing SS1, SS2, SS3 to stop and thereby represent on its bank of contacts SS1a, SS2a, SS3a, SS9a the cost of mailing the package to the zone represented by S3. In a similar manner any other zone could have been chosen by pushing the appropriate button represented by S3–S11 and the results for that zone would be represented on the contacts of SS1, SS2, SS3, after the same procedures have been followed as for S3. In other words there is a complete individual cost channel for each zone—for regular mail and for airmail.

The cost as represented on SS1, SS2, SS3, SS9 banks of contacts are visually shown on some such available indicator as the Nixie tubes or electromechanical indicators which would be connected to the respective SS1, SS2, SS3, SS9 circuits.

Special services such as those of insurance, special delivery, etc., may be required by the customer. Such services may be provided by the use of circuits which will superimpose on the already calculated values for zone and weight, the cost of such services. To demonstrate this, insurance and special delivery are used as examples.

The switch S11 is used to represent the insurance service and S14 is used to represent special delivery service.

When S11 is pushed it locks itself into holding position. Nothing further can happen until the zone weight cost representation has been completed as evidenced by relay R5 being energized due to SS1, SS2, SS3, having reached the aforementioned match position with SS11 or other zone switch. Energizing of relay R5 closes a circuit to relay R17 which causes SS2 to step once by closing contact P17. Thus the value of 10¢, the minimum for insurance, has been inserted into the cost representation circuit and the visual indicator. As this insertion is made, S11 is released by the opening of P17, thus opening the circuit to relay R17. This readies the circuit for the next insurance requirement. Other values of insurance may be obtained by either operating the circuit until the required insurance is reached or by the use of a circuit such as is used for special delivery and described more fully hereinafter.

If a patron requires the package to go airmail, then S2 in FIGURE 6 is pushed as well as the zone switch. This causes relay R7 to be energized and locked into the circuit. The closing of contacts P7 of the R7 relay switches the regular mail banks of the zone switches to the airmail banks which are banks e, f, g of SS11. Banks SS11e, SS11f, SS11g are connected in a similar manner as noted for SS11b, SS11c, SS11d to the respective banks of SS1a, SS2a, SS3a. As described above SS1, SS2, SS3 are stepped to match SS11e, SS11f, SS11g, respectively. If special delivery switch S14 is pushed, relay R20 would add to the SS1 steppers that amount represented by the pulsing of relay R20 in the SS7a circuit of FIGURE 6 as described more fully hereinafter.

By pushing S14, the special delivery service may be inserted into the cost representation circuit. S14 locks itself into the circuit. Two conditions must be met before any further operation of this circuit. First, relay R5 must have been energized as explained above. Second, the insurance relay R17 must not have been energized or if it had it must have been deenergized. The circuit will be held "ready" until these conditions are met by S14 being held in closed position by magnetic coils. When the conditions are met relay R19 will be energized and contact P19 will be closed to step SS7. The stepping of SS7 once closes off neutral switch ONSS7 to cause the self-stepping of SS7. The self stepping of SS7 causes relay R15 to be pulsed in accordance to the condition of relays R9, R7, R14, and R19. This causes SS1 to be stepped once for each closing of contact P15. The pushing of S14 also causes relay R8 to be energized which in turn energizes the circuit provided by the weight representation position of SS19 and condition airmail push switch S2. The position of arm SS19 and switch S2 determines which of the relays R9, R10, R11 or R14 will be energized. If R9 is energized then R15 and consequently SS1 will be pulsed five times. If R10 is energized, then R20 and consequently SS2 will be pulsed five times. If R11 is energized then R20 and consequently SS2 will be pulsed six times. If R14 is energized R20 and consequently SS2 will be pulsed eight times. R15 and consequently SS1 will be pulsed five times. Thus the cost of special delivery for various weights and regular or airmail may be introduced into cost representation.

Thus, costs of various other services may be added and their costs introduced into the cost representation circuit by the addition of similar appropriate circuits.

The purchase of certain Post Office items such as stamps, cards, etc. might be desired in conjunction with the shipping of a package or separately.

Again, such items may be obtained by the use of circuits which will superimpose on the already calculated value for zone and weight or may be obtained by themselves by the use of appropriate circuits to pulse SS1, SS2, SS3 and SS9 in accordance with the cost of items.

To demonstrate this, items such as stamps and post cards will be used as illustrations. Push button S15 is used for 20 5¢ stamps, S16 is used for 25 4¢ stamps, S17 is used for 2 5¢ stamps, S18 is used for postcards.

For example wishing to obtain 20 5¢ stamps, S15 is pushed. This causes R125 to energize and to in turn, energize R130 which locks itself in. As contact P130 closes, the issue circuit is made ready. If parcel post is used then its value has been provided for as described above as has any special services that have been initiated. If a parcel is not to be mailed through the machine, issue of the stamps will take place as soon as money is deposited.

Similarly, other items may be obtained.

Post cards may be obtained by pushing S18 which closes the circuit to SS50 if special services are not in use. Stepping of SS50 pulses R128 which in turn steps SS1 five times for each card purchased.

Thus the cost of items chosen are inserted into the cost representation circuit and thus SS1, SS2, SS3 and SS9 represent on their contacts the cost of services and/or items contracted for.

Since services have been contracted for a certain monetary value a means is provided for inserting coins and bills to satisfy the indicated cost.

FIGURE 8 illustrates circuitry whereby coins and bills are identified and their values represented in the circuitry. Coins are inserted in slot 114 of FIGURE 1 and are identified and separated in acceptor 2. The value is identified to the circuit by switches LS7–LS11. LS7 represents pennies, LS8 nickels, LS9 dimes, LS10 quarters and LS11 halves.

LS7 causes SS4 to step once for each penny identified. LS8 causes R23 to energize and close P23 and SS31 to self step to off-neutral position. This pulses SS4 five times. LS9 steps SS5 once for each dime inserted. LS10 causes R25 to energize and P25 to close. This causes SS30 to self step to off-neutral position R24 is thereby caused to pulse SS5 twice for each quarter. At the same time R25 causes SS3 to self step to off-neutral position. SS4 is thereby pulsed five times for each quarter. LS11 causes R26 to be energized and initiate the self-stepping of SS30. The stepping of SS30 causes relay R24 to be pulsed five times and consequently SS5 is pulsed five times. Thus all coin values can be inserted into currency value representation.

Similarly $1 bills are inserted into validator 20 and $5 bills into validator 20a. The $10 unit is not shown except in the circuitry.

LS12 represents one dollar bills as recognized by the bill validator, and LS13 represents five dollar bills as recognized by the bill validator. LS12 steps SS6 once for each one dollar bill accepted. LS13 energizes R29 which in turn causes SS8 to self step to off-neutral position. As SS8 steps, R31 is pulsed five times. This causes SS5 to be stepped five times for each five dollar bill. LS14 represents ten dollar bills as recognized by bill validator. LS14 steps SS10 once for each ten dollar bill accepted by validator.

Thus all values of coins and bills can be inserted into the machine and totaled to give a currency value representation on the contacts of SS4, SS5, SS6 and SS10.

There is now a cost representation and a currency value representation and they are matched to show their relationship. In FIGURE 6 contacts of SS1b are tied to contacts of SS4a; contacts of SS2b are tied to contacts of SS5a; contacts of SS3b are tied to contacts of SS6a; and contacts of SS9b are tied to contacts of SS10a in a one to one, two to two, and three to three etc. fashion.

The relative positions of the arms of SS1b, SS2b, SS3b and SS9b to the arms of SS4a, SS5a, SS6a and SS10a will determine the next requirement. If the arms of SS1b, SS2b, SS3b, SS9b are ahead of SS4a, SS5a, SS6a, SS10a then more money must be put into the machine; if they are behind, then the requested services and change will be deposited in receptacle 17. If they are matched, then the services will be deposited in the receptacle as they are chosen.

To obtain change for the amount overdeposited, change initiation switch S100 is pushed. As a result, relay R121 is energized and locks itself into the circuit. Relay R120 is also energized and locks itself into the circuit. Contact P120 in SS1, SS2, SS3, SS9 circuit closes to cause SS1, SS2, SS3, and SS9 to step until match point with the respective SS4, SS5, SS6, SS10 is reached at which time energizing of relays R16, R21, R22, and R39 causes P16, P21, P22, P39 contacts to open thus stopping the stepping of SS1, SS2, SS3, SS9. As SS1, SS2, SS3, and SS9 have been stepping, ISS1 has been pulsing SS40f a corresponding step. As SS2 has been stepping, R56 has stepped SS41 a corresponding step. As SS3 has been stepping, R57 has been pulsed and its contact P57 has been stepping SS42 corresponding steps.

The matching of SS1 to SS4 causes P16 in the R68 circuit to open and P16 in the change circuit to close. Thus, SS40 is allowed to return to home position. In doing this, YY7 is energized once for each step and ejects one penny for each step of SS40. If SS40 has not gone beyond the fifth contact. If it has gone beyond the sixth contact it will eject one penny for each contact beyond the sixth and one nickel as R82 is energized on the sixth contact. Relay R82 also opens the penny circuit so no pennies will be ejected as SS40 returns the last six contacts. If SS40 stops on the sixth contact no pennies will be ejected since R82 is energized and one nickel will be disbursed.

The matching of SS2 to SS5 causes relay R21 to energize and contact P21 in YY1 circuit to close. This allows solenoids YY1–YY6 to be energized in accordance with the position of the arm on contacts of SS41. Thus, as illustrated, the arm is on contact 3, which causes R44 to be energized and locked into the circuit but R45 has already been locked in, and therefore, YY4 and YY3 will be energized and each will eject a dime from its respective coin tube shown in FIGURE 3.

The match circuit of SS3 to SS6 causes relay R22 to be energized. This causes contact P22 to allow clutch circuit to be energized and to operate the conveyors in accordance with SS42.

LS1, LS2, LS3, LS4, LS5, LS6 are limit switches which control the corresponding clutches for moving the conveyors C1, C2, C3, C4, C5, C6, and C7. These conveyors cooperate with bill validator 20.

If stepping switch SS42 has been stepped by pulses generated when SS32 was stepped to match SS6, sufficiently forward the number of dollars required to balance cost and money received, then the actual dollar difference is represented on stepping switch SS42. Contact P21 closes as a result of dollar stepping switch SS3 and money inserted stepping switch SS6 having been matched. This causes relay R23 to energize through SS42 and P21 and close a circuit to relay R26 if there is a bill in the conveyor C1 as evidenced by LS1a being closed. This causes switch SS42 to step back once. When the dollar bill conveyor C1 has been passed out of the conveyor and another has entered, the above circuit is ready to deliver the second in a similar operation of the circuit provided the SS42 switch has not reached the home or zero position. This continues until either the sixth contact representing $5 has been reached or the first or home contact is reached. Limit switch LS1a indicates by its closed position that there is a bill in the conveyor C1. Likewise, limit switch LS1b indicates that there is a bill in conveyor C1 when it is open. Closing of contact P23 and limit switch LS1a energizes relay R26 which closes contact P26 and energizes clutch CL1 to move a bill out into receptacle 17. When the bill is out of the conveyor C1, limit switch LS1a will open causing R26 to deenergize and to open circuit to conveyor C1, but limit switch LS1b closes to keep conveyor clutch CL1 energized and C1 running. Conveyor C1 will continue to operate until limit switch LS1b opens. LS1b opens when a bill from conveyor C2 has gone to a predetermined point in conveyor C1. A bill will be fed from conveyor C2 only if limit switch LS2a indicates by its closed position that there is a bill in its corresponding conveyor C2 and limit switch LS1c is closed indicating that there is no bill in conveyor C1. Since conveyor C2 will have no bill after transfer to conveyor C1, limit switch LS2b is closed and, if conveyor C3 has a bill in it, clutch CL3 will be energized to feed a bill into conveyor C2. This continues until the bill has left conveyor C3. Additional bills are passed out of C1 by the backward stepping of switch SS42 as it is sequenced by limit switch LS1a and contact P26. If stepping switch SS42 should pass contact six, then relay R24 would energize and the dollar bill circuit would be opened by contact P24. Then stepping switch SS42 would be stepped to zero contact without operating the dollar bill conveyors C1 through C5. But, as with the dollar conveyor C1 through C7, would cause conveyor C1a to convey a bill to the receptacle 117. Also the empty conveyor C1a would be filled from a similar conveyor C2a ahead of it in the same manner as described for the $1 above. The bills in the C1a conveyor would be of the $5 denomination.

If a one dollar bill is inserted in the discriminator, and if it is passed, it will actuate limit switch LS6 to energize conveyor clutch CL6. This causes output conveyor C6 to run. When the bill has passed by the limit switch LS6, conveyor C6 will stop. If conveyors C1 through C5 are full and there is a bill in the output end of conveyor C7, this last bill will be deposited in the bill hopper as the conveyor C6 receives the bill from the discriminator 20. If conveyors C1 through C5 are not filled, the bill will be fed into conveyor C5. The same procedure is followed for the $5 circuit. Thus any change up to $9.99 difference in cost can be made with the embodiment shown. Broadening of the embodiment can easily be made by these skilled in the art. The $10 discriminator is not shown except in phantom in the schematics. But it is understood that one is needed if there is a need for a $5 change requirement.

The tilting of conveyor C7 about shaft 33 is controlled by limit switch LS5c which controls CH1.

The stamp print circuit shown in FIGURE 9 consists of SS43, SS44, SS45, SS46 having its contacts respectively connected to corresponding contacts of SS1, SS2, SS3, SS9, SS43, SS44, SS45, SS46 and will step along with SS1, SS2, SS3, SS9 through the self stepping contacts ISS43, ISS44, ISS45, ISS46. Interruption of the self-stepping occurs when match position between SS1, SS2, SS3, SS9 and SS43, SS44, SS45, SS46 is reacted. As a result R116, R117, R118, R119 are energized which causes contacts P116, P117, P118, P119 to open in the self stepping circuit of SS43, SS44, SS45, SS46. The stepping of SS43, SS44, SS45, SS46 causes pulses to be transmitted to respective print head wheel coils F1, F2, F3, F4. Thus the print wheels will reflect the monetary value represented by the arm position on the contacts of SS1, SS2, SS3, SS9. Time delay relay R58–61 may be used to obviate continuous current on the coils F1–F4. When match position for currency and cost has been reached for the parcel as evidenced by R105 having been energized in the manner previously described, the printing of value and, if chosen, special services and airmail occurs and timer motor T10 is started. Then, in sequence controlled by a cam driven by timer motor T10, motor M2 starts and after a predetermined length of tape has been moved, the motor M2 is stopped and solenoid 200 is energized to cut off the tape with knife blades 161, 162 of FIGURE 13. After solenoid 200 is deenergized, the entire circuit is deenergized or reset through R36 all of which is controlled by timer T10. The circuit and machine are ready for the next run.

There are many ways known to the art of vending articles in machines. For simplicity no particular form of dispensing articles is shown. The type of articles used will help to determine the form the mechanism will take for easiest handling of the article. Any suitable type well known to the art is acceptable when tied into the circuitry as described above for post cards etc.

In like manner, any of the receipt issuing mechanisms may be tied to the circuitry in a manner described in the similar issuing of a printed stamp. The particular requirement for the receipt will determine the interconnection to the circuitry.

The use of item issuing can be avoided by the use of the off neutral contact of SS19 in the item circuit described above and shown in right hand column of FIGURE 7. The patron using the parcel post portion of the machine may still obtain items by the use of local push buttons.

Conventional switches and fuses may be added, as desired, to the circuit for safety and circuit protection.

From the circuit it is evident that data may be translated into printed or visual records or stored by appropriately attaching such equipment to the circuits of the drawings as understood by those skilled in the art.

From the foregoing it will now be seen that there is herein provided an improved and new postal machine and new actuating circuitry therefor which accomplishes all the objects of this invention, and others, including many advantages of great practical utility and commercial importance.

As many embodiments may be made of this inventive concept as obtain within the purview of this invention as desired by those skilled in the art without departing therefrom. Therefore, it is to be understood that all matter herein is to be interpreted merely as illustrative, and not in a limiting sense.

I claim:
1. In a postal vending machine, the combination comprising:
first means for sensing a physical characteristic of an article to be transported,
second means for indicating the destination of the article,
third means responsive to said first means and said second means for representing the cost of transporting the article to its destination,
fourth means for selecting items,
fifth means for representing the cost of the items selected,
sixth means for totaling the costs represented by said third means and said fifth means,
seventh means for receiving money and representing the total money received,
eighth means for comparing the representation of said sixth means and said seventh means and representing the difference therebetween, and
ninth means responsive to the difference representation of said eight means to dispense change and the items selected.

2. The invention of claim 1 wherein said seventh means includes means for receiving coins and bills and said ninth means includes means for dispensing coins and bills.

3. The invention as recited in claim 2 wherein said seventh means is connected with said ninth means to feed coins and bills from said seventh means to said ninth means for use in making change.

4. In a vending machine, the combination comprising:
first means for selecting items,
second means for determining the cost of each selected item,
third means for totaling the costs determined by said second means,
fourth means for receiving payment for the items selected after said third means has totaled the costs,
fifth means for comparing the payment received with the total cost,
sixth means responsive to said fifth means for making change when the payment received exceeds the total cost, and
seventh means responsive to said fifth means for dispensing the selected items when the payment received equals or exceeds the total cost.

5. The invention as recited in claim 4 wherein said fourth means includes means for receiving coins and bills, means for placing the received coins in dispensing tubes, means for placing the received bills on dispensing conveyors and a container for collecting received coins and bills after the coin dispensing tubes and bill dispensing conveyors are full.

6. The invention as recited in claim 4 wherein the items to be selected include postcards and said seventh means includes means for cutting a card strip into predetermined lengths in accordance with the number of postcards selected.

7. The invention as recited in claim 4 wherein the items to be selected include postage stamps and said seventh means includes a strip of material and means for printing postage stamps on said paper in accordance with the kind and number of postage stamps selected.

8. Apparatus for determining the cost of transporting an article to a destination comprising:
first means for sensing a physical characteristic of the article and representing the physical characteristic as an electric signal;
second means for determining the transportation cost of the article in accordance with the physical characteristic sensed by said first means, said second means including a plurality of memory means each including transportation cost data with respect to a geographical zone;
third means coupling said electrical signal of said first means to said second means; and
fourth means coupled with said second means for representing the transportation cost of the article as determined by said second means in accordance with the geographical zone of the destination of the article and the physical characteristic of the article sensed by said first means.

9. The invention as recited in claim 8 wherein said third means includes fifth means for connecting one of said plurality of memory means with said first means, said one memory means representing a geographical zone including the destination of the article.

10. The invention as recited in claim 8 wherein each of said plurality of memory means includes a network having a first set of contacts for receiving the electrical signal from said first means and a second set of contacts for indicating the transportation cost of the article.

11. The invention as recited in claim 8 wherein the apparatus further comprises fifth means for receiving money and representing the amount of money received as an electrical signal, sixth means for comparing the signal from said fifth means with the cost represented by said fourth means and having an output representative of the difference there between, and seventh means for dispensing change in accordance with the output of said sixth means.

12. The invention as recited in claim 8 wherein the apparatus further comprises fifth means for satisfying the cost represented by said fourth means and sixth means for issuing a receipt after the cost has been satisfied.

References Cited
UNITED STATES PATENTS

| | | | |
|---|---|---|---|
| 3,023,874 | 3/1962 | Zindel | 194—10 |
| 3,112,019 | 11/1963 | Simjian | 194—2 |
| 3,358,801 | 12/1967 | Feldzer | 194—10 X |

STANLEY H. TOLLBERG, *Primary Examiner.*